United States Patent

[11] 3,550,610

| | | |
|---|---|---|
| [72] | Inventor | Charles Thomas Ziegler<br>14242 Victory Blvd., Van Nuys, Calif. 91401 |
| [21] | Appl. No. | 804,544 |
| [22] | Filed | Mar. 5, 1969<br>Continuation-in-part of Ser. No. 698,958, Jan. 18, 1968, abandoned. |
| [45] | Patented | Dec. 29, 1970 |

[54] MEANS TO DETECT CHANGES IN LEVEL OF A STREAM OF WATER
6 Claims, 3 Drawing Figs.

[52] U.S. Cl. .................................................. 137/101.25,
137/368, 137/394, 417/20, 61/18
[51] Int. Cl. .................................................. G05d 27/02
[50] Field of Search ........................................... 61/1, 2, 18,
19, 20, (Inquired); 261/25, 76—78, 78.1, 121,
123, 124, 120; 210/170, 220, 221, 198, 199, 63;
137/364, 368, 394, 484.2, 44, 502, 101, 25;
103/42, 41, 25; 251/44; 73/213; 417/20

[56] References Cited
UNITED STATES PATENTS

| | | | | |
|---|---|---|---|---|
| 2,490,251 | 12/1949 | Bracy ........................... | | 103/25 |
| 2,747,598 | 5/1956 | Wooldridge ................. | | 103/21 |

FOREIGN PATENTS

| | | | |
|---|---|---|---|
| 922,545 | 6/1947 | France ........................ | 137/502 |

*Primary Examiner*—William F. O'Dea
*Assistant Examiner*—William H. Wright
*Attorney*—Smyth, Roston & Pavitt ABSTRACT: To detect when a flowing stream rises to a given level, a venturi tube is located at the given level so that a vacuum will be created therein by the flowing water. Means responsive to the vacuum signals the rise in level of the stream.

PATENTED DEC 29 1970

3,550,610

INVENTOR.
Charles Thomas Ziegler

ATTORNEYS

MEANS TO DETECT CHANGES IN LEVEL OF A STREAM OF WATER

This application is a Continuation-in-part of my application entitled "VACUUM PRODUCING MEANS", Ser. No. 698,958 filed Jan. 18, 1968 now abandoned.

The invention relates to means to detect the rise in level of a flowing stream.

For this purpose a casing is positioned to be submerged only when the liquid level of the flowing stream rises to a relatively high level whereupon water flowing through the casing creates a vacuum therein and means responsive to the vacuum signals the rise of the water level to the relatively high level.

Figure 1:
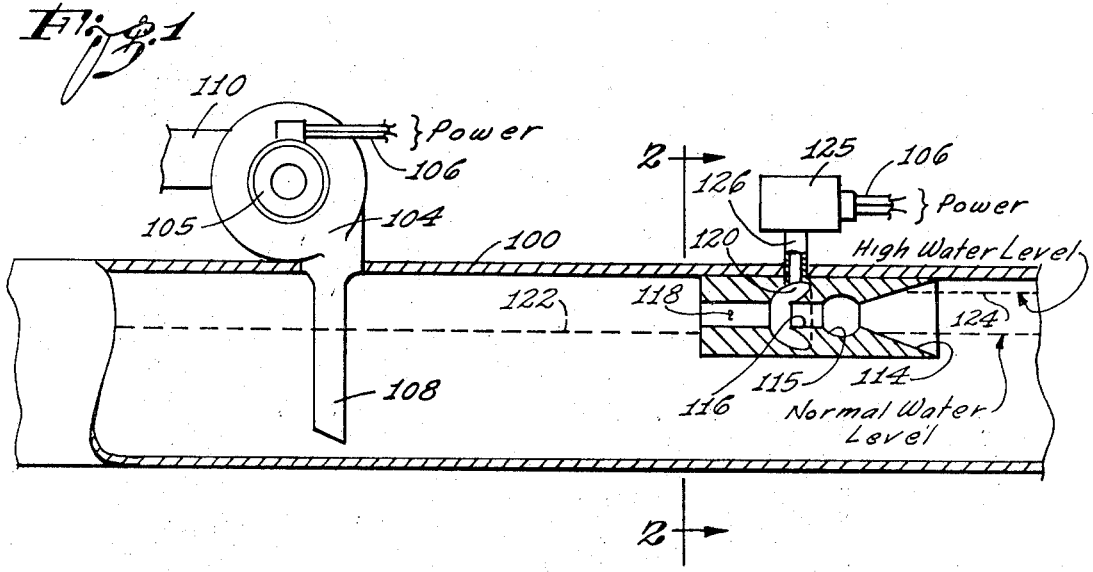
FIG. 1 is a more or less schematic sectional view of a selected embodiment of the invention.
Figure 2:
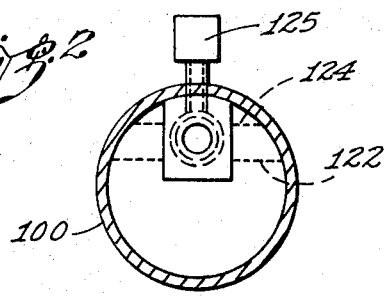
FIG. 2 is a transverse section along the line 2–2 of FIG. 1.
Figure 3:
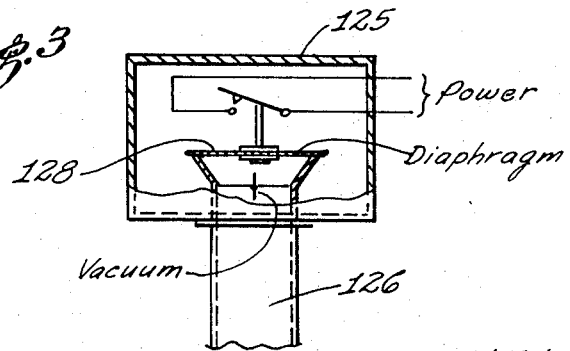
FIG. 3 is an enlarged sectional view of a control box shown in FIGS. 1 and 2.

In the embodiment of the invention shown in FIGS. 1, 2 and 3, a stream of water flows through a large conduit 100 which has a given normal capacity for gravity flow. The invention provides means to detect when the flow of water through the conduit 100 approaches the normal capacity for gravity flow and the invention further provides means to draw water from the conduit 100 whenever it is necessary to exceed the normal capacity of the conduit for gravity flow.

The means to withdraw water from the conduit 100 may comprise a centrifugal pump 104 actuated by a motor 105 that is supplied with electric power by cables 106. The inlet port of the pump communicates with an intake pipe 108 that extends into the conduit 100 and the output port of the pump is connected to a corresponding discharge pipe 110.

The means to detect the volume of flow through the conduit 100 responds to the rise in the liquid level of the stream in the conduit. In the construction shown, a small casing 112 inside the conduit 100 is positioned adjacent the top wall of the conduit and functions in the same general manner as a venturi tube.

As indicated in FIG. 1 the small casing 112 has a longitudinal passage therethrough with a convergent inlet section 114 followed by an expansion chamber 115 which, in turn, is followed by a tunnel section 16. The tunnel section 116 discharges into a final nozzle section 118 and is in communication with an annular vacuum chamber 120. The expansion chamber 115 may be omitted if desired.

In the zone where the accelerated stream of water communicates with the vacuum chamber 120, the drop in static pressure in the water creates a vacuum in the chamber 120 and suitable means energizes the motor 105 in response to the vacuum. When the water flowing through the conduit 100 is below the liquid level 120 no water flows through the small casing 112 and consequently atmospheric pressure exists in the vacuum chamber 120 and the pump motor 105 is deenergized. When the water rises to a substantially higher level, for example the liquid level 124, the venturi effect of water flow through the small casing 112 creates a sufficient vacuum to cause the pump motor 105 to be energized. The means to detect the creation of a vacuum in the vacuum chamber 120 and to close the motor circuit in response to the vacuum may be constructed in various ways in various practices of the invention.

In this particular embodiment of the invention, the means to detect the vacuum and to close the motor circuit is housed in a control box 125 that is mounted on the upper end of a standpipe 126 from the vacuum chamber 120. The upper end of the standpipe 126 is flared and is spanned by a suitable diaphragm 128 that responds to the differential between atmospheric pressure and the pressure in the vacuum chamber 120. When the two pressures are equal the diaphragm is of a normal configuration shown in FIG. 3. When a vacuum exists in the vacuum chamber 120, the diaphragm flexes downwardly and thereby closes the circuit of the pump motor 105. For this purpose the diaphragm 128 is connected by a rod 130 to a normally open switch 132 in the motor circuit.

My description in specific detail of the selected embodiments of the invention will suggest various changes, substitutions and other departures from my disclosure.

I claim:

1. Means to detect rise in the level of a flowing stream of water, comprising:

a casing having a passage therethrough oriented in the direction of the stream for water flow through the passage from an inlet end of the passage to a discharge end of the passage, said passage being reduced in cross section downstream from the inlet end for acceleration of the velocity of the stream in the passage with consequent drop in the static pressure to form a zone of subatmospheric pressure in the passage; and means responsive to the pressure differential between the atmosphere and said zone to detect the drop in pressure in said zone, said casing being at a relatively high level in the range of water levels of the stream to cause said detecting means to operate only when the flowing stream rises to a relatively high level.

2. A combination as set forth in claim 1 which includes means to withdraw water from the flowing stream to reduce the water level of the stream, said withdrawing means being operatively responsive to said detecting means to operate when the stream rises to said relatively high level.

3. A combination as set forth in claim 1 in which said detecting means includes:

a sealed chamber in communication with said zone;

a diaphragm forming a portion of the wall of said chamber; and means responsive to changes in flexure of the diaphragm.

4. A combination as set forth in claim 1 in which said detecting means includes switch means connected to the diaphragm for operation thereby.

5. A combination as set forth in claim 4 which includes means to withdraw water from the flowing stream to reduce the water level of the stream, said withdrawing means being operatively responsive to said switch to operate when the stream rises to the relatively high level.

6. A combination as set forth in claim 5 in which said withdrawing means is an electrically driven pump.